United States Patent Office 3,531,508
Patented Sept. 29, 1970

3,531,508
NITRILE SUBSTITUTED ORGANO-POLYSILOXANE POLYMERS
Gordon K. Goldman, Los Angeles, and Lester Morris, Encino, Calif., assignors to Products Research & Chemical Corporation, Burbank, Calif., a corporation of California
No Drawing. Filed June 26, 1967, Ser. No. 648,980
Int. Cl. C07f 7/10
U.S. Cl. 260—448.2                6 Claims

ABSTRACT OF THE DISCLOSURE

A method for producing a viscous, liquid polysiloxane nitrile substituted polymer which is highly resistant to hydrocarbon solvents and which can be cured to a solid rubbery substance which also is highly resistant to hydrocarbon solvents, said method comprising reacting an organic polysiloxane hydride liquid polymer with an olefinic hydrocarbon (or halogenated hydrocarbon) nitrile, the double bond in said nitrile compound being at least one carbon atom away from the nitrile group (e.g. allyl nitrile), in the presence of a catalyst, the amount of nitrile compound and reaction time being sufficient to react 50 to 100% of the hydride groups present in the organic polysiloxane hydride liquid polymer with said nitrile.

---

The liquid polysiloxane nitrile substituted polymer referred to above is stable in the absence of moisture. If it is desired to produce a liquid polysiloxane nitrile substituted polymer which is curable to a solid rubbery substance it is necessary that the nitrile substituted polymer have at least one hydride group which has not been substituted with the nitrile compound or, in the alternative, that the starting organic polysiloxane hydride liquid polymer have reactive groups capable of condensation or addition.

Compositions which embody the above nitrile substituted polymers, both in the cured ond uncured state, and a method of curing said polymers.

BACKGROUND OF THE INVENTION

Silicone rubbers based, primarily, on polysiloxane polymers which contain fillers, cross-linking agents, vulcanizing agents, pigments, catalysts and other additives are well-known and commercially available. These particular types of polymers have been used to a great extent by industry. However, as a general rule, these polysiloxane polymers have not had outstanding fuel resistance. This disadvantage has to some extent detracted from their use.

As could be expected, a great amount of research has been conducted in an effort to provide elastomeric materials which can withstand a wide temperature range as well as having a high resistance to hydrocarbon solvents.

Among the most successful commercial elastomers available today which have both heat and fuel resistance are the so-called "fluoro silicones" which are generally trifluoro propyl substituted polymethyl siloxanes. These so-called "fluoro silicones" have not been entirely satisfactory due to a number of reasons.

In addition to the fluoro silicones, described supra, other polysiloxane polymers have been made which are more resistant to hydrocarbon solvents, such as benzene, than "normal" polysiloxane polymers. For example it has been stated in the literature that the addition of an unsaturated nitrile to dichloro methyl silane followed by hydrolysis results in a polymer which is not affected by benzene. The unsaturated nitrile which has been used most extensively is acrylonitrile. Unfortunately, however, the resulting polymer was not reproducible. This is not particularly surprising since polymerization of the nitrile addition product produces conditions which tend to hydrolyze the nitrile group. In addition, the hydroxy substituted intermediates containing a nitrile group do not readily polymerize to high polymers. This, of course, prevents any great use of these polymers to produce elastomeric rubbers.

SUMMARY OF THE INVENTION

The present invention is based upon the surprising discovery that polysiloxane polymers having a very high resistance to hydrocarbon solvents and useful with a wide temperature range can be produced by starting with a polymeric polysiloxane hydride and an olefinic hydrocarbon nitrile, the olefinic double bond being separated from the nitrile group by at least one carbon atom. The resulting polymer, i.e. the nitrile substituted polysiloxane, is stable to hydrolysis in boiling water under neutral conditions, shows no weight change when exposed to hot aromatic containing fuels, and is flexible to minus 60° F. The polymers of this invention are stable indefinitely at 300° F. without addition of any stabilizer, losing at most 1% of their weight.

In addition to the foregoing method and composition the present invention also provides a method for curing or vulcanizing the nitrile substituted polysiloxane.

It is thus an object of the present invention to embody a fuel and temperature resistant nitrile substituted polysiloxane liquid polymer which can be reproduced under a variety of reaction conditions.

It is another object to provide and disclose a polysiloxane nitrile substituted polymer which can be cured to a solid rubbery substance having good resistance to hydrocarbon solvents.

A still further object of the present invention is to disclose and provide a novel method for producing a nitrile substituted polysiloxane polymer.

The foregoing objects are accomplished in the present invention by reacting an organic polysiloxane hydride liquid polymer with an olefinic hydrocarbon or halogenated hydrocarbon nitrile, the olefinic double bond being separated from the nitrile group by at least one carbon atom. Reaction occurs between the hydride group in the polysiloxane liquid polymer and the olefinic double bond contained in the nitrile compound, producing a substituted nitrile polysiloxane liquid polymer. To insure fuel resistance, the amount of the nitrile compound and the length of reaction time should be such that between 50 and 100% of the hydride groups are replaced by the nitrile compound. The resulting polymer is a viscous liquid which can be used as a pressure seal (particularly when admixed with pigments) for an indefinite period inasmuch as the liquid polymer will not harden in the presence of normal atmospheric conditions if all of the hydride groups are substituted with the nitrile compound. If one or more of the hydride groups are left unsubstituted in the polysiloxane nitrile substituted polymer then, as a general rule, the polymer should be protected from atmospheric moisture inasmuch as there is a tendency for the polymer to cure and harden. The nitrile substituted liquid polymer is, in addition, useful as a lubricant, particularly when resistance to hydrocarbon solvents is an important criterion.

If it is desired to cure the nitrile substituted polysiloxane liquid polymer to a solid rubbery substance having a very high resistance to hydrocarbon solvents and if said liquid polymer does not contain reactive end groups, e.g. hydroxy groups, alkoxy groups, acyloxy groups or the like, then at least one (up to 50%) of the hydride groups should remain intact in the polymer, i.e. at least one of the hydride groups should not be substituted by nitrile. The reason for this limitation is because if the polysiloxane polymer does not contain reactive end groups then it is necessary that at least one hydride group be present in order that the polymer can be vulcanized or cured. If, on the other hand, there are reactive end groups, such as a polysiloxane hydride liquid polymer having terminal hydroxyl groups, then the hydride groups can be completely substituted by nitrile groups because the available hydroxy radicals insure that the resulting polymer can be cured in a variety of ways.

The starting fluid polysiloxane hydride polymers of this invention should have at least three hydride groups, preferably more, e.g. from 5 to 50, and have a viscosity of at least 10 cps., preferably between 50 to 25,000 cps. These polysiloxane hydrides are well-known in the art and therefore no detailed definition thereof will be given herein. However, as a general rule such polymers have an average unit formula

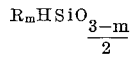

where R is a hydrocarbon radical or a halogenated hydrocarbon radical and $m$ has an average value of from 0 to 2, preferably about 1. Exemplary radicals are alkyl radicals such as methyl, ethyl, butyl and octadecyl; alkenyl radicals such as vinyl, allyl, octadecenyl or hexenyl; cycloaliphatic hydrocarbon radicals such as cyclobutyl or cyclohexyl; and aromatic radicals such as benzyl, naphthyl or tolyl. Examples of halogenated hydrocarbon radicals useful in the present invention are chloromethyl, dibromophenyl, fluoroethyl, chlorophenyl, difluorovinyl, chlorofluoroethyl, or 3,3,3-trifluoropropyl.

A typical formula of the polysiloxane hydride polymers of this invention is:

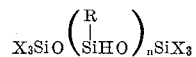

where R is defined as above and X is the same as R (e.g. alkyl such as methyl) or is a reactive group capable of condensation such as hydroxyl, alkoxy, aryloxy, amine, or acyloxy, and $n$ is an integer of at least 3, preferably from 5 to 50.

The foregoing polysiloxane hydride polymers are reacted with an unsaturated hydrocarbon nitrile; the amount of nitrile being sufficient so that the nitrile replaces at least 50% of the hydride groups of the polysiloxane polymer. As has been stated previously, the unsaturated nitrile and the hydride react at the double bond of the unsaturated hydrocarbon (or halogenated hydrocarbon) nitrile. Any olefinic hydrocarbon or halogenated hydrocarbon nitrile is usable in the present invention; the only criterion being that the hydrocarbon radical of the nitrile compound contain one double bond located at least one carbon atom from the nitrile group so that the double bond reacts at the hydride portion of the polysiloxane hydride polymer. Preferably the nitrile compound contains from 3 to 12 carbon atoms. The hydrocarbon radical may contain halogens (e.g. Cl, Br, I, or F) which generally increases the reactivity of the olefinic double bond. The hydrocarbon radical, in addition, can be substituted with the cyano group.

As has already been noted, the resulting polysiloxane nitrile substituted liquid polymer will remain in the liquid state indefinitely even when exposed to atmospheric conditions. This is particularly true when all of the hydride groups have been replaced with the nitrile compound. If one or more of the hydride groups remain then it would be desirable to protect the liquid polymer from an excess of moisture in order to prevent the polymer from curing.

If it is desired to cure the nitrile substituted polysiloxane liquid polymer and if the starting polysiloxane hydride liquid polymer does not contain reactive end groups then at least one of the hydride groups should remain unsubstituted. If, in the nitrile substituted polysiloxane liquid polymer, there remains one or more hydride groups (up to 50% of the hydride groups can be unsubstituted) the resulting polymer can be cured to an elastomer. For example, by merely adding water (preferably in the presence of an alkaline substance, e.g. an amine such as tetramethyl guanidine, and a condensation catalyst such as a metal salt, e.g. lead octoate) to the liquid polymer. The chemical reaction can be exemplified as follows:

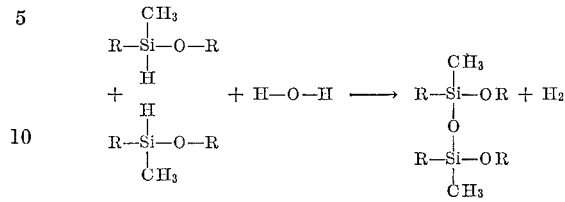

where R is the remainder of the liquid polymer.

In the alternative, the nitrile substituted polymer containing one or more hydride groups can be cured by admixing therewith a polyvinyl compound in the presence of a hydrogenation catalyst (e.g. platinum, platinized carbon, nickel, activated carbon, chloroplatinic acid, palladium or potassium chloro platinate). One of the vinyl groups react with a hydride group contained in one of the liquid polymer molecules while another of the vinyl groups react with a hydride group contained in another molecule. Any hydrocarbon (preferably having from 4 to 12 carbons) containing two or more vinyl groups is operable in this invention. Preferred are compounds of the formula: $H_2C=CH—(R)_n—CH=CH_2$, where R is hydrocarbon of from 1 to 10 carbon atoms and $n$ is 0 or 1. Examples of compounds falling within the above formula are divinyl benzene (ortho, meta or para), 1,3-butadiene, and 1,4-pentadiene.

An alternative way of curing the nitrile substituted polysiloxane hydride liquid polymer is to react the hydride group or groups of said polymer with hydrocarbon alcohol such as one having the formula R—OH wherein R is alkyl of from 1 to 6 carbon atoms. This reaction is preferably conducted in the presence of a metal (e.g. copper, nickel, cobalt or iron).

The foregoing reaction can be exemplified chemically as follows:

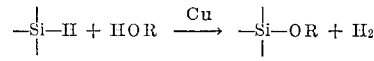

The alkoxide formed in the preceding reaction can be cured or vulcanized in a conventional manner by known cross-linking agents such as alkyl silicate (e.g. ethyl silicate "40") in the presence of conventional condensation catalysts such as metal salts, e.g. lead octoate or dibutyl tin dilaurate.

A preferred way of curing the nitrile substituted liquid polymers of this invention is to react the hydride group or groups with a vinyl compound containing 1 to 3 reactive groups (preferably 2 or 3) capable of being polymerized, i.e. groups capable of condensation or addition. The reaction takes place between the hydride group or groups and the vinyl group and thus this reaction is similar to the reaction between the polysiloxane hydride liquid polymer and the unsaturated nitrile compound. For example, exactly the same catalysts are used for both reactions.

This resulting liquid polymer containing reactive groups can be cured in a conventional manner with any of a number of well-known cross-linking agents and condensation catalysts. If, on the other hand, the starting polysiloxane hydride liquid polymer contains reactive end groups capable of condensation then there is no need to react the nitrile substituted derivative thereof with a vinyl compound containing reactive groups since the availability of reactive end groups insures that the polymer can be cured in a conventional manner with the same well-known cross-linking agents and condensation catalysts.

The unsaturated hydrocarbon nitrile has, preferably, from 3 to 12 carbon atoms in the hydrocarbon group attached to the nitrile radical. The preferred nitrile compounds of this invention have the following formula:

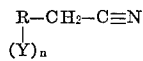

wherein $n$ is 0 to 3; Y is chloro, bromo, iodo, fluoro; and R is an olefinic unsaturated hydrocarbon radical such as —CH=CH$_2$; —CH$_2$—CH=CH$_2$

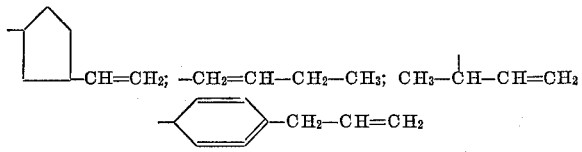

and —CH$_2$(CH$_2$)$_4$—CH=CH$_2$—CH$_3$. Specific examples of nitriles coming within the foregoing formulae are allyl nitrile, 1-hexene-6-nitrile, 3,3-dichloro-1-pentene-5-nitrile, 4-bromo-1-hexene-6-nitrile.

As has already been noted, the reaction between the nitrile compound and the polysiloxane hydride occurs at the double bond of the hydrocarbon portion of the nitrile compound and hence is similar to an addition or hydrogenation reaction. Preferably, this reaction takes place in the presence of a catalyst and heat. Any hydrogenation or addition catalyst can be used; such catalysts being well-known in the art. Examples of such addition catalysts are platinum, platinized carbon, nickel, activated carbon, chloroplatinic acid, potassium chloro platinate, and chloroplatinic acid hexahydrate.

The above reaction can take place by heating the two reactants, i.e. the liquid polysiloxane hydride polymer and the unsaturated nitrile, until both liquids are compatible with each other. The precise temperature, of course, depends upon the particular two reactants being used. However, as a general rule, the temperature at which the two reactants are initially heated is from 50° C. to 150° C. This heating step should be conducted in the presence of a hydrogenation or addition catalyst as noted above. If necessary or desirable, after the two reactants are heated until they are compatible the temperature may be raised again in order to increase the reaction rate between the nitrile compound and the polymer. Here again, the precise temperature at which the two components should be heated depends upon the particular reactants being used and the speed of the reaction desired. Generally speaking the two reactants can be heated anywhere between 100° C. to as high as 300° C.

As an alternative method, and one which generally increases the rate of the foregoing reaction, the hydrogenation or addition catalyst is dissolved in a suitable solvent such as alcohol which in turn is added to the nitrile compound. To the foregoing mixture is slowly added the liquid polysiloxane hydride polymer with gentle stirring and heating. If a sufficient amount of the nitrile compound and catalyst is added the hydride groups will become completely substituted by the nitrile compound in twenty-four hours.

An excess of the nitrile compound is normally used where rapid and complete substitution by the nitrile is desired. Lesser amounts are employed where less substitution is desired. The length of the reaction time will generally depend upon the degree of substitution of the nitrile compound desired and the amount of nitrile used. The degree of substitution can easily be determined by an infrared spectrophotometer. For example, when the infrared scan shows that 80% of the hydride has reacted with the nitrile compound the resulting reaction product-admixture can be evacuated to remove any excess nitrile. If, however, one does not wish to use an infrared spectrophotometer in order to determine how long the reaction should be conducted then the precise amount of nitrile compound can be added to obtain the desired degree of substitution. For example, if it is desired that 50% of the hydride groups be substituted with nitrile then one-half mole of nitrile should be added per hydride group. If, on the other hand, it is desired that 100% of the hydride groups be substituted by the nitrile compound then one mole or more (preferably more) of the nitrile compound should be added per hydride group.

A typical starting liquid polysiloxane hydride polymer is L-31, a trimethyl silane end-capped polymethyl siloxane hydride having eleven hydrides per chain, said polymer being available from the Union Carbide and Carbon Corporation. Such a polymer is stated to have the following formula:

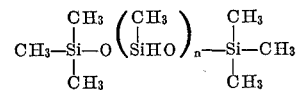

where $n$ has an average value of about eleven.

Preparation of the nitrile substituted polymer is typically carried out as follows:

| | Parts by weight |
|---|---|
| L-31 (polysiloxane hydride) | 100 |
| Allyl nitrile | 100 |
| Plantinized carbon (catalyst) | 0.1 |

The two liquids are placed in a three-necked glass flask equipped with stirrer and reflux condenser. The temperature is brought up to 100° C. at which time the liquids are compatible. A portion of the catalyst is then added at which time the liquid boils violently at 120° C. Additional catalyst is added from time to time and the temperature is gradually raised to 150° C. over four hours. At the end of this time, the infrared scan shows 90% of the hydride groups have reacted, i.e. one hydride group is left unsubstituted per molecule. The product is evacuated to remove the excess nitrile, cooled and filtered.

As an alternative to the foregoing method chloroplatinic acid hexahydrate is dissolved in alcohol. The foregoing solution is added to the allyl nitrile in an amount sufficient to have $10^{-6}$ moles of acid catalyst per mole of allyl nitrile. To the resulting solution is slowly added L-31 with gentle reflux. The temperature is maintained at 120° C. for twenty-four hours. At the end of this time, the infrared scan shows that 100% of the hydride groups have reacted with the allyl nitrile. The resulting polymer is a viscous liquid polymer which is useful as a mastic, particularly where resistance to hydrocarbon solvents is a criterion. In addition, this viscous liquid nitrile substituted polymer is very useful as a lubricant since it is stable over an indefinite period of time, i.e. it will not harden, and, in addition, is useful for wide temperature ranges as well as being highly resistant to hydrocarbon fuels. As has already been noted, this 100% substituted nitrile polymer cannot be vulcanized or cured.

The 90% nitrile substituted polymer, prepared as above, will cure without the addition of any catalyst by merely exposing said polymer as a film, up to about 25 mils, in an oven at 300° F. for one hour. At the end of this time, a rubbery film is produced which is insoluble in hydrocarbon fuels and has good adhesion to aluminum. After three days at 300° F., the film is less rubbery and has a straw color. If it is desired to cure the 90% nitrile substituted liquid polymer more rapidly then the liquid polymer is admixed with water, preferably in the presence of an alkaline material such as an amine. Any primary or secondary amine is operable in the present invention; e.g. ammonia, tetramethyl guanidine, and propyl amine to mention but a few. The alkaline material increases the rate of reaction between the hydride group or groups and the water. In order to cure this polymer it is generally desirable to also add a condensation catalyst such as an organo-metallic compound. Condensation catalysts useful in this reaction are set out more fully infra.

In the case, such as above, where there is only one hydride group available per molecule the reaction will form a dimer with evolution of hydrogen gas. Unless the reaction is carried out very carefully the hydrogen gas will have a tendency to foam the resulting polymer which is oftentimes undesirable.

A more preferable way of curing the polysiloxane nitrile substituted polymers of this invention is to convert the hydride group to a reactive group capable of condensation such as hydroxyl, alkoxy, aryloxy, amine, or acyloxy. The foregoing substitution takes place, in general, in the same manner as the reaction between the polysiloxane hydride liquid polymer and the nitrile compound. The nitrile substituted polysiloxane hydride polymer is reacted with a compound which contains reactive groups capable of condensation and which also contains a vinyl group; the reaction taking place between the hydride group or groups in the polymer and the double bond in the reactive compound. Since this reaction, as already noted, is similar to the reaction between the polysiloxane hydride polymer and the unsaturated nitrile compound the same catalyst is used. These catalysts have already been exemplified above and will not be defined here again.

Preferably the so-called reactive compound contains two to three reactive groups, of the type set forth above, per molecule. This increases the functionality of the resulting polymer so that instead of only forming dimers the polymer can be cured into a branch chained polymer.

Preferably, the vinyl containing compounds used for attachment to the hydride on the polymer have the general formula $R_nSi(OR^1)_{4-n}$ wherein R is hydrocarbon containing at least one vinyl group (preferably R contains from two to twelve carbon atoms), $n$ is one or two and $R^1$ is hydrogen, lower alkyl, aryl, or a saturated aliphatic monoacyl radical of a carboxylic acid. Particularly preferred compounds coming within above formula are those wherein $n$ is one, R is lower alkenyl and $R^1$ is lower alkyl. Examples of such compounds are vinyl triethoxy silane, vinyl tributoxy silane, and allyl triethoxy silane.

A presently preferred embodiment for preparing a nitrile substituted polymer containing reactive groups capable of condensation is as follows:

The 90% nitrile substituted polysiloxane hydride, produced above, is utilized in this example. The excess nitrile is removed from the reaction mixture but the addition catalyst (platinized carbon) is allowed to remain in the reaction mixture in order to catalyze the reaction between vinyl triethoxy silane and the hydride groups which remain in the nitrile substituted polymer. An equivalent amount of the vinyl triethoxy silane is added to the polymer and the resulting mixture is cooked until the hydride band has disappeared which indicates that the hydride groups which remained in the original nitrile substituted polymer have been substituted with the vinyl triethoxy silane compound. This reaction product can be cured in a conventional manner with known condensation catalysts or, in the alternative, by using conventional cross-linking agents and condensation catalysts.

Examples of such cross-linking agents, which are useful in the present invention, are alkyl polysilicates, e.g. ethyl silicate; amino silanes; amino silazanes; acyloxy silanes, e.g. methyl triacetoxy silane; polyvinyl alkoxy silanes; and alkoxy silanes, e.g. ethoxy silane or methyl-triethoxy silane.

Condensation catalysts which are useful in curing the vinyl triethoxy silane reaction product; which has either been reacted with one of the foregoing cross-linking agents or is used per se, have been extensively mentioned in the patent literature and are generally well-known in the art.

Condensation catalysts which may be mentioned are organo-metal compounds, for example, phenyl mercury acetate, dibutyl tin dilaurate, dibutyl tin maleate or zinc octoate; metal oxides; acids such as oleic acid and boric acid; and metal chelates such as chromium acetyl-acetonate. It should be particularly emphasized that the foregoing condensation catalysts are merely exemplary; there being many other well-known in the art which are operable in the present invention.

The particular amount of the condensation catalyst is not critical; however, preferably the amount of catalyst is from 0.1 to 5% by weight, based on the weight of the polysiloxane hydride polymer. Similarly, the amount of cross-linking agent is not particularly critical. Preferably the amount of cross-linking agent is sufficient to completely react either the hydride groups in the polymer, if any remain, or the reactive end groups. Generally speaking, anywhere from 0.2% to as high as 50%, by weight based on the weight of the polysiloxane hydride, can be used. Preferably the amount is from 0.5% to about 15% by weight. Of course it is understood that the actual amount of cross-linking agent employed will depend, to a greater or lesser extent, upon the particular type of cross-linking agent and polymer employed.

A specific example of curing the polymer produced in the foregoing example is as follows:

| Compound: | Parts by weight |
|---|---|
| Vinyl triethoxy silane | 100 |
| Reaction product: | |
| Dibutyl tin dilaurate (catalyst) | 0.5 |
| Tetramethyl guanidine (accelerator) | 0.1 |

The above mixture rapidly produced a rubbery gel on exposure to the atmosphere. This gel did not soften in hot aromatic fuel and was stable for at least eight hours to boiling water although it reversibly softened somewhat.

As another alternative the 10% hydride containing product is mixed with condensation catalysts similar to the ones utilized above in the immediate preceding example, and exposed to moisture. A foamy, rubbery gel was produced which was very similar to that obtained when utilizing the vinyl derivative.

The elastomers of this invention may be compounded in the usual manner for compounding any siloxane elastomer. For example, a wide variety of fillers are known and employed in silicone rubber stocks. Mica dust, diatomaceous earth, carbon blacks, brown chalk and many other known fillers for silicone rubbers can be utilized in this invention. The filler can be added in any amount desired, but usually from about 20 to 150 parts by weight of filler per 100 parts by weight of the nitrile substituted polymer is used. Compositions of this invention can also be modified by the incorporation of other ingredients commonly employed in the compounding of silicone elastomers, such as pigments and oxidation inhibitors.

The compositions of this invention are useful in a variety of ways such as potting, caulking or sealing compounds. In addition, the compositions of this invention can also be utilized as adhesives or protective coatings.

While we have described this invention with respect to certain specific embodiments and applications, it is understood that various modifications may be made thereof without departing from the spirit and scope of the invention as claimed hereinafter.

We claim:
1. A nitrile substituted liquid organo-polysiloxane polymer having a high resistance to hydrocarbon solvents, said nitrile substituted polymer being derived from a liquid polysiloxane hydride polymer of the formula

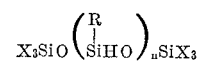

where R is alkyl, X is a member selected from the group consisting of alkyl and aromatic of from 6 to 10 carbon atoms, and $n$ is an integer of from 5 to 50, at least 50% of the hydride groups of the liquid polysiloxane hydride polymer being substituted by a member selected from the group consisting of hydrocarbon nitrile having from 3 to 12 carbon atoms and halogenated hydrocarbon nitrile having from 3 to 12 carbon atoms, the nitrile group being located at least 3 carbon atoms from the silicon atom of the polysiloxane polymer.

2. A nitrile substituted liquid organo-polysiloxane polymer according to claim 1 wherein at least 50% of the hydride groups of the liquid polysiloxane hydride polymer are substituted by a hydrocarbon nitrile having from 3 to 12 carbon atoms in the hydrocarbon group.

3. A nitrile substituted liquid organo-polysiloxane polymer according to claim 6 wherein $R^2$ is hydrocarbon of from 2 to 11 carbon atoms.

4. A nitrile substituted liquid organo-polysiloxane polymer according to claim 1 wherein 50% to 98% of the hydride groups of the liquid polysiloxane hydride polymer are substituted by nitrile.

5. A nitrile substituted liquid organo-polysiloxane polymer according to claim 1 wherein 100% of the hydride groups of the liquid polysiloxane hydride polymer are substituted by nitrile.

6. A nitrile substituted liquid organo-polysiloxane polymer of the formula

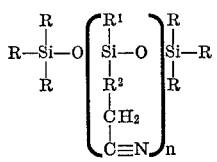

wherein each of R and $R^1$ is lower alkyl, $R^2$ is a member selected from the group consisting of hydrocarbon of from 2 to 11 carbon atoms and halogenated hydrocarbon of from 2 to 11 carbon atoms, and $n$ is 5 to 50.

References Cited

UNITED STATES PATENTS

| | | | |
|---|---|---|---|
| 2,970,150 | 1/1961 | Bailey | 260—448.2 XR |
| 2,999,077 | 9/1961 | Nitzsche et al. | 260—448.2 XR |
| 3,026,278 | 3/1962 | Walton, et al. | 260—448.2 XR |
| 3,035,016 | 5/1962 | Bruner | 260—448.2 XR |
| 3,109,013 | 10/1963 | Haluska | 260—448.2 |
| 3,161,614 | 12/1964 | Brown et al. | 260—448.2 XR |
| 3,168,544 | 2/1965 | Jex | 260—448.2 |
| 3,177,236 | 4/1965 | Jex et al. | 260—448.2 |
| 3,185,663 | 5/1965 | Prober | 260—448.2 XR |
| 3,185,719 | 5/1965 | Prober | 260—448.2 |
| 3,257,440 | 6/1966 | Jex | 260—448.2 |

TOBIAS E. LEVOW, Primary Examiner

P. F. SHAVER, Assistant Examiner

U.S. Cl. X.R.

260—46.5, 37